US00RE41344E

(19) United States
(12) Reissued Patent
Funaki et al.

(10) Patent Number: US RE41,344 E
(45) Date of Reissued Patent: May 25, 2010

(54) SWIRL CHAMBER USED IN ASSOCIATION WITH A COMBUSTION CHAMBER FOR DIESEL ENGINES

(75) Inventors: Koichi Funaki, Osaka (JP); Seishiro Kubo, Osaka (JP)

(73) Assignee: Kubota Corporation, Osaka (JP)

(21) Appl. No.: 11/601,616

(22) Filed: Nov. 17, 2006

Related U.S. Patent Documents

Reissue of:
(64) Patent No.: 6,899,076
Issued: May 31, 2005
Appl. No.: 10/663,186
Filed: Sep. 16, 2003

(30) Foreign Application Priority Data

Sep. 27, 2002 (JP) ..... 2002-282390
Mar. 25, 2003 (JP) ..... 2003-082996
Jul. 31, 2003 (JP) ..... 2003-283365

(51) Int. Cl.
*F02B 19/18* (2006.01)

(52) U.S. Cl. ..... 123/263; 123/286; 123/290; 123/291; 123/293

(58) Field of Classification Search ..... 123/263, 123/275, 285, 286, 290, 291, 293
See application file for complete search history.

(56) References Cited

U.S. PATENT DOCUMENTS 2,380,615 A * 7/1945 Sheppard ..... 123/291
4,635,598 A * 1/1987 Tanaka et al. ..... 123/286
4,676,209 A * 6/1987 Etoh et al. ..... 123/293
4,798,183 A * 1/1989 Hataura et al. ..... 123/279
5,746,173 A * 5/1998 Takii et al. ..... 123/293
5,769,050 A * 6/1998 Ito et al. ..... 123/263

FOREIGN PATENT DOCUMENTS

| | | | | |
|---|---|---|---|---|
| EP | 0828065 | A2 | | 3/1998 |
| JP | 53049609 | A | | 5/1978 |
| JP | 57056618 | A | | 4/1982 |
| JP | 60-95129 | A | * | 5/1985 |
| JP | 60-95129 | | * | 5/1985 |
| JP | 1-91034 | | * | 6/1989 |
| JP | 1-91034 | U | * | 6/1989 |
| JP | 1-34657 | | * | 10/1989 |
| JP | 1-34657 | Y2 | * | 10/1989 |
| JP | 05321672 | A | | 12/1993 |
| JP | 07097924 | A | | 4/1995 |
| JP | 09144542 | A | | 6/1997 |
| JP | 10-82322 | | * | 3/1998 |
| JP | 10-82322 | A | * | 3/1998 |
| JP | 11294168 | A | | 10/1999 |
| JP | 2001271646 | A | | 10/2001 |

* cited by examiner

*Primary Examiner*—Erick Solis
(74) *Attorney, Agent, or Firm*—Panitch Schwarze Belisario & Nadel LLP

(57) ABSTRACT

A swirl chamber used in association with a combustion chamber for diesel engines, includes a pair of sub-nozzle holes on the opposite sides of a main nozzle hole to supply a secondary air into the swirl chamber, the sub-nozzle holes being positioned such that the secondary air ejected therethrough is fully utilized for the combustion in the swirl chamber, thereby securing the complete combustion and the reduction of environmental contaminants such as NOx and fumes.

22 Claims, 10 Drawing Sheets

0.0
NOx →

Fumes →
4~10
0.0

0.0
NOx + Fumes →
3~15
60%
70%
6~10
85%
100%
98%
7~8
0
5
10
15
20
25
Cross-sectional area %

SWIRL CHAMBER USED IN ASSOCIATION WITH A COMBUSTION CHAMBER FOR DIESEL ENGINES

Matter enclosed in heavy brackets [ ] appears in the original patent but forms no part of this reissue specification; matter printed in italics indicates the additions made by reissue.

TECHNICAL FIELD

The present invention relates generally to a combustion chamber for diesel engines, and more particularly, to improvements upon a swirl chamber used in association with a combustion chamber for diesel engines.

BACKGROUND ART

In general, diesel engines are notorious as a major source of environmental contaminants such as NOx and fumes. However, no effective measures have been accomplished for solving those problems. It is known that these problems are due to the incomplete combustion in the engine occurring because of inadequate mixing of air and fuel. To solve these problems, swirl-aided combustion systems are commonly used. Here is one example for tackling this problem, which is disclosed in Japanese Patent Laid-open Application No. 07-97924. Referring to FIG. 10, the known combustion chamber fitted with a swirl chamber will be described:

In FIGS. 10A and 10B the right-hand side (toward the central axis 103) is called "rearward", and the left-hand side (toward the cylinder liner 104) is "forward" each as designation for convenience only. The known combustion chamber shown in FIGS. 10A *and 10B* is provided with a cylinder 101 having a cylinder head 105, a reciprocating piston 102, and a combustion chamber 109. In addition, the cylinder head 105 is provided with a recess 106 in which a mouthpiece 107 is fitted. The mouthpiece 107 is provided with a top-open recess 107a, and t15he recess 106 includes a bottom-open recess 106a. The top-open recess 107a and the bottom-open recess 106a constitute a space 108 functioning as a swirl chamber, hereinafter the space being referred to as "swirl chamber 108". The swirl chamber 108 communicates with the combustion chamber 109 through a main nozzle hole 111 having a center axis 113. The main nozzle hole 111 is forwardly inclined toward the swirl chamber 108. The mouthpiece 107 is additionally provided with a pair of sub-nozzle holes [102] *112*, through which a secondary air is forced into the swirl chamber 108 on the compression stroke. The sub-nozzle holes 112 are symmetrically positioned on opposite sides of the central axis 113–114 as shown in FIG. 10A.

Under the construction mentioned above, however, a major disadvantage is that the second air ejected through the sub-nozzle holes 112 does not reach the central part of the swirl chamber 108, thereby failing to bring about effective swirls therein. In this way the conventional sub-nozzle holes 112 are not conducive to the full utilization of the secondary air.

The disadvantages mentioned above is due to the following arrangement of the sub-nozzle holes 112: When a hypothetical sphere 115 is supposed about the center *107c* of the open end 107b of the top-open recess 107a, and the radius of the open end 107b and that of the sphere 115 are respectively supposed to be 100% and 70%.

The sphere 115 having a radius of 70% passes outward, whereas the sphere 115 having a radius of 50% passes inward in FIGS. 10A and 10B. In this situation, the central axis 112a–112b of each of the sub-nozzle holes 112 passes outside the sphere 115.

In another aspect, when the mouthpiece 107 is seen from just above, the sub-nozzle holes 112 have their upper openings 112c deviated from the center of the swirl chamber 108 so that even if every sub-nozzle hole is oriented vertically, the central axis 112a–112b of each sub-nozzle hole 112 cannot pass inside the 50% sphere 115.

Accordingly, an object of the present invention is to provide an improved swirl chamber capable of causing effective swirls to help air and fuel being well mixed, and dispersing the fuel well in the swirl chamber.

Another object of the present invention is to provide an improved swirl chamber capable of reducing the production of both NOx and fumes, not one or the other under the conventional system.

SUMMARY OF THE INVENTION

[According to the] *The* present invention[,] *is directed to* a swirl chamber used in association with a combustion chamber[, wherein the] *for diesel engines. The* combustion chamber is defined by a piston, a cylinder, and a cylinder head[, includes a]. *A* mouthpiece *is* fitted in a [hole] *recess* of the cylinder head, the [hole having] *recess has* a bottom-open recess, and the mouthpiece [including] *includes* a top-open recess[, the]. *The* bottom-open recess and the top-open recess [constituting] *constitute* a space for the swirl chamber[; a]. *A* main nozzle hole *is* produced through a base wall of the mouthpiece to allow the swirl chamber to effect communication between the combustion chamber and the swirl chamber[; and a]. *A* pair of sub-nozzle holes [which] are separated from the main nozzle hole[,] *and are* produced through the base wall of the mouthpiece[, the]. *The* holes [being] *are* positioned on opposite sides of [the] *a* central axis of the main nozzle hole when the mouthpiece is seen from just above[; wherein each of the sub-nozzle holes is arranged to pass inside a hypothetical sphere depicted around a center of an upper circle of the top-open recess and having a radius of 70% of a diameter of the upper circle of the top-open recess]. *A hypothetical sphere is centered at a center of an upper circle of the top-open recess. The hypothetical sphere has a radius of 70% of a radius of the upper circle of the top-open recess and each of the sub-nozzle holes is arranged to pass a central axis of the sub-nozzles through an interior area of the hypothetical sphere.*

BRIEF DESCRIPTION OF THE DRAWINGS

FIG. 6 is generally a graph showing the relationship between the cross-sectional area of the sub-nozzle holes and the characteristics of gases exhausted from the swirl chamber of FIG. 3.

DESCRIPTION OF PREFERRED EMBODIMENTS

Throughout the drawings like numerals are used to designate like components, and in FIGS. 1B, 3B, 7B, 8B, 9B, and 2A the right-hand side is "forward", and the left-hand side is "rearward" for convenience of illustration only. A first embodiment is shown in FIGS. 1 to 6, in which a pair of sub-nozzle holes 12 are provided upright in parallel with the central axis 3 of a cylinder 1. This is the same with a second embodiment shown in FIG. 7, but in the third embodiment shown in FIG. 8 and a fourth embodiment shown in FIG. 9 the sub-nozzle holes 12 are slightly converged and slightly diverged toward their top open ends, respectively. The feature common with all the embodiments is that the sub-nozzle holes are spaced from, and positioned symmetrically on opposite sides of, the main nozzle hole. In addition, the sub-nozzle holes are produced on the forward side.

Figure 3A:
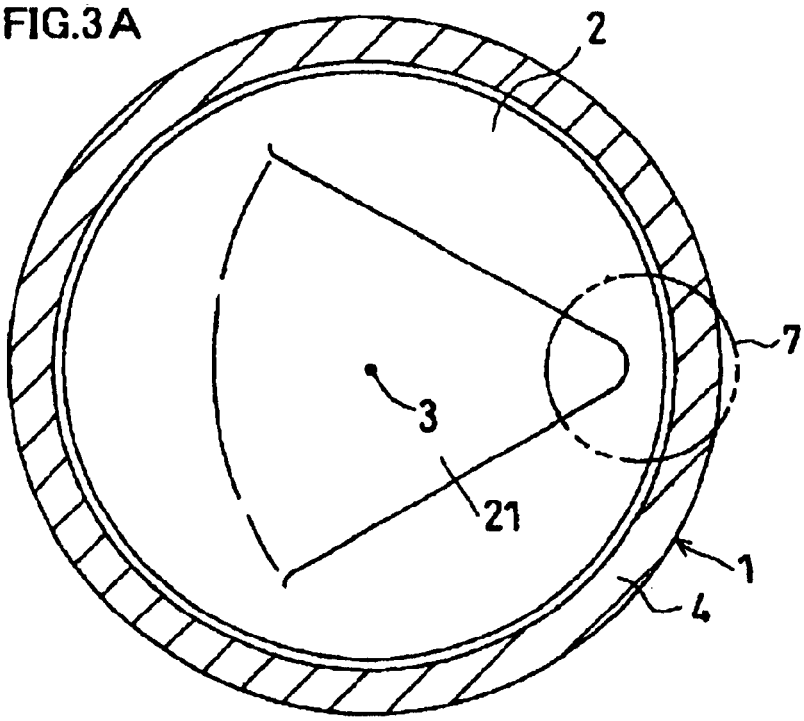
FIG. 3A being a horizontal cross-sectional plan view of a cylinder incorporating a piston, and FIG. 3B being a cross-sectional side view of the swirl chamber and the surrounding part members.
Figure 3B:
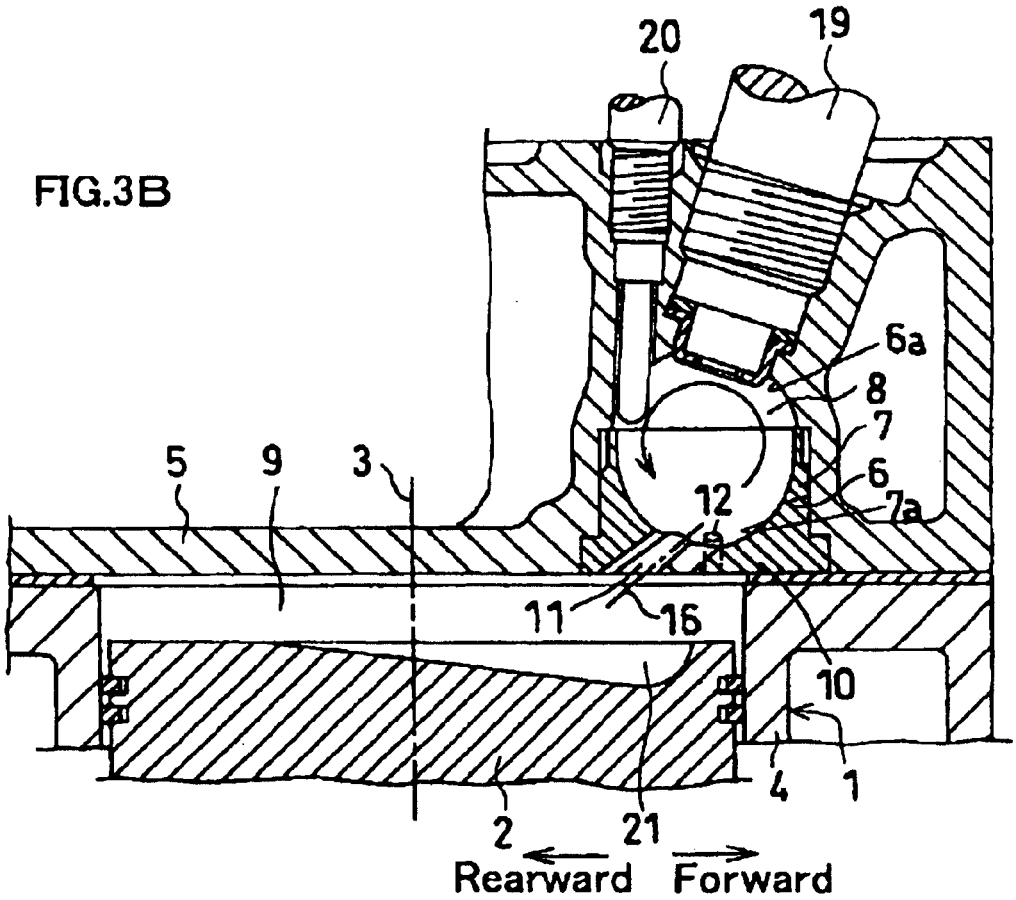
FIG. 3 is generally a diagrammatic view exemplifying the swirl chamber shown in FIG. 1.

In FIG. 3B a reciprocating piston 2 is provided inside a cylinder 1 along whose central axis 3 the piston 2 moves up and down. The cylinder 1 has a head 5 having a recess 6 in which a mouthpiece 7 is fitted. The recess 6 includes a bottom-open recess 6a, and the mouthpiece 7 includes a top-open recess 7a. The bottom-open recess 6a and the top-open recess 7a constitute a space 8 that is utilized as a swirl chamber. The cylinder 1 is provided with a combustion chamber 9 having a main nozzle hole 11 passing through the mouthpiece 7. The combustion chamber 9 and the swirl chamber 8 communicate with each other through the main nozzle hole 11, which is forwardly inclined toward the swirl chamber 8 from the combustion chamber 9, as shown in FIG. 3B. The mouthpiece 7 has an undersurface 7d in a plane perpendicular to the central axis 3 of the cylinder 1.

As best shown in FIG. 3B, a fuel jet nozzle 19 and a heat plug 20 are provided toward the swirl chamber 8. The piston 1 is provided with a triangular recess 21 adapted to guide a gas flow, wherein the root portion of the recess 21 is positioned immediately below the main nozzle hole 11, and as best shown in FIG. 3A, the recess 21 expands progressively far from the main nozzle hole 11, thereby having a diminishing depth, as best shown in FIG. 3B.

The principle underlying the combustion chamber 9 fixed with the swirl chamber 8 is as follows:

On the compression stroke the piston 2 rises, thereby introducing compressed air into the swirl chamber 8 to cause swirls therein. When the piston 2 reaches the top dead point, fuel is ejected through the ejection nozzle 19. The fuel is mixed with the air in the swirl chamber 8, and the charge of fuel and air is ignited, and burned in the chamber 8, and as a result, it expands in volume. The expanded gases pass into the combustion chamber 9 through the main nozzle hole 11. The fresh charge expands and rises as it goes away from the main nozzle hole 11 in the triangular recess 21. The fuel-content in the fresh charge mixes with air in the combustion chamber 9, and the mixture is ignited and burned.

Figure 1A:
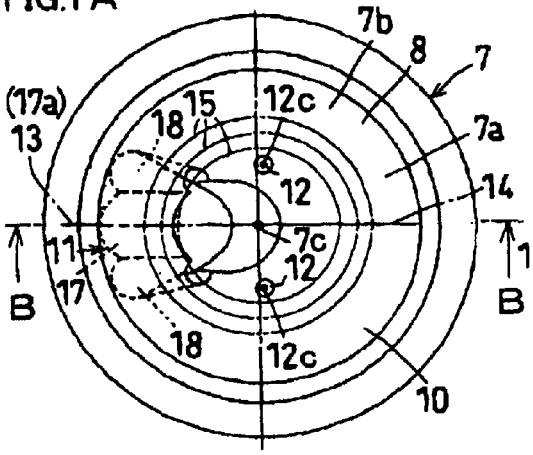
FIG. 1A being a plan view, FIG. 1B being a cross-sectional view taken along the line B—B of FIG. 1A.
Figure 1C:
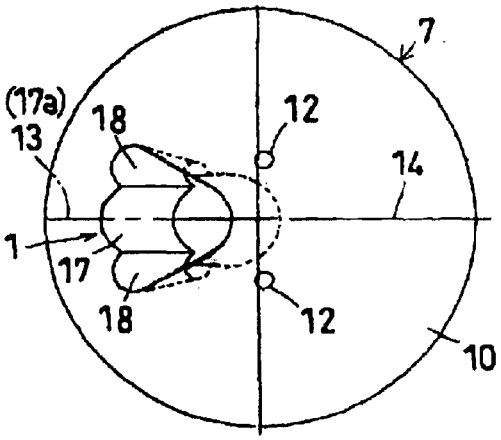
FIG. 1C being a bottom view, and FIG. 1D being a cross-sectional view taken along the line D—D.
Figure 1B:
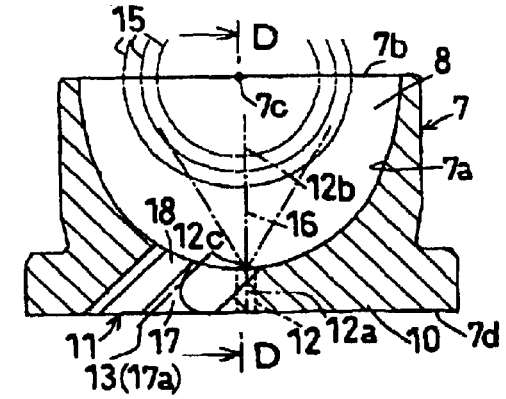
FIG. 1 is generally a diagrammatic view exemplifying a first embodiment of the present invention.
Figure 1D:
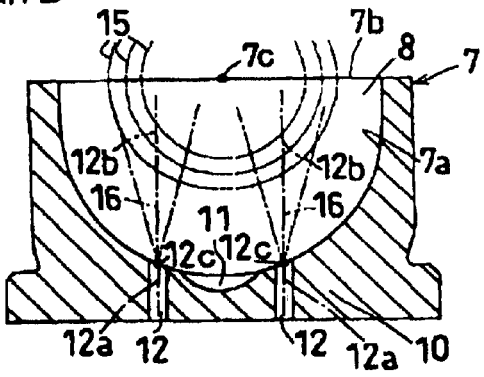

The sub-nozzle holes 12 will be described:

In FIGS. 1A to 1D, particularly in FIGS. 1B and 1D, the sub-nozzle holes 12 are provided in pair through a base wall 10 of the mouthpiece 7. Each of the sub-nozzle holes 12 is away from the main nozzle hole 11 such that they are symmetrically positioned about the central axis 13 of the main nozzle hole 11 or about its extension 14, depending upon the shape of the main nozzle hole 11.

FIGS. 1A, 1B, and 1D show a hypothetical sphere 15 about a center 7c which is the center of the open end 7b (*an upper circle*) of the recess 7a. The radius of the open end 7b (*an upper circle*) is supposed to be 100%, and that of the sphere 15 to be 50%. Each of the sub-nozzle holes 12 is positioned such that its central axis 12a–12b passes through the sphere 15, or in the drawing, through *an interior area of* the sphere 15.

Preferably, the radius of the sphere 15 is 70%; more preferably, 60%, and most preferably, 50%. In FIGS. 1A, 1B, and 1D the innermost, middle, and outermost sphere 15 are drawn in correspondence to 50%, 60%, and 70%, respectively. It has been demonstrated that this range of angular positioning of the sub-nozzle holes 12 enables a secondary air to gather at the center of the swirl chamber 8, thereby making the most of the air ejected through the sub-nozzle holes 12 and causing effective swirls in the swirl chamber 8.

FIG. 1A shows, as a preferred embodiment, that the center 12c of the *upper* open end of each sub-nozzle hole 12 overlaps the sphere 15 having a radius of 50% when the mouthpiece 7 is seen from just above, thereby enabling the central axis 12a–12b of each sub-nozzle hole 12 to pass through the center of the swirl chamber 8. In this case, the radius is preferably 70%, more preferably 60%, and most preferably 50% of that (100%) of the open end (*upper circle*) of the top-open recess 7b.

In FIGS. 1[A] *B* and 1D, a hypothetical reference line 16 extends just upwards. The position of each hole 12 is determined in relation to this hypothetical reference line 16; that is, each sub-nozzle hole 12 is positioned such that its central axis 12a–12b coincides with the reference line 16 in every direction as viewed in FIGS. 1A to 1D.

In this way the sub-nozzle holes 12 are positioned at various angles for the reference line 16 (FIGS. 1B and 1D). If it is positioned at a relatively small angle to the reference line 16, the sub-nozzle hole 12 can be short in length, thereby reducing frictional resistance to the flow of a secondary air passing through the sub-nozzle hole. In FIG. 1B where the cross-section of the mouthpiece 7 is viewed from the side, and the two sub-nozzle holes 12 appear to be in alignment. *In the case where the mouthpiece 7 is viewed from a side, as shown in FIG. 1B*, the central axis 12a–12b of the sub-nozzle hole 12 is preferably inclined at 30° or less to the reference line 16, which will be referred to as "first angle". In FIG. 1D where the cross-section of the mouthpiece 7 is viewed from the back, and the sub-nozzle holes 12 appear to be arranged side by side. *When the main nozzle hole 11 is positioned at a rearward side portion of the mouthpiece 7 and the mouthpiece 7 is viewed from a rear of the mouthpiece 7*, the central axis 12a–12b *of the sub-nozzle hole 12* is preferably inclined at 15° *or less,* which will be referred to as "second angle". In another preferred embodiment the first angle is 15° or less, and the second angle is 8° or less; more preferably, 8° or less to 4° or less, and most preferably, 4° or less to 2° or less.

In the embodiment illustrated in FIGS. 1B and 1C the first angle is 30° and the second angle is 15° each angular relation being indicated by chain lines.

The size of each sub-nozzle hole 12 is determined as follows:

It has been demonstrated that when the main nozzle hole 11 has an open end having an effective area is supposed to be 100%, the total area of the open ends of the two sub-nozzle holes should be in the range of 3% to 15%; preferably, 4 to 10%; more preferably, 6 to 10%, and most preferably, 7 to 9%. In short, the range of 3 to 15%, or preferably, of 5 to 15% is effective to reduce the production of NOx and fumes evenly.

Figure 2A:
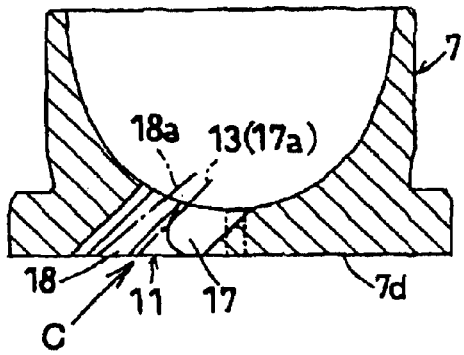
FIG. 2A being a vertical cross-sectional side view of the mouthpiece, FIG. 2B being a perspective view of the nozzle hole.
Figure 2B:
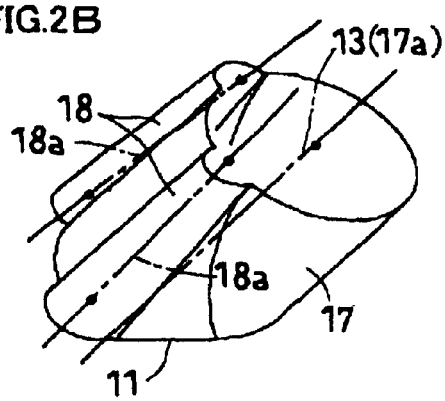
FIG. 2 is generally a diagrammatic view exemplifying the nozzle hole in the mouthpiece shown in FIG. 1.
FIG. 2C being a diagrammatic view of the nozzle hole viewed in the direction indicated by the arrow C in FIG. 2A, and FIG. 2D being a bottom view of the nozzle hole.
Figure 2C:
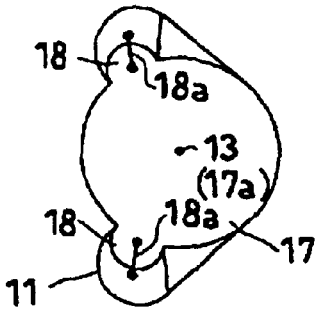
Figure 2D:
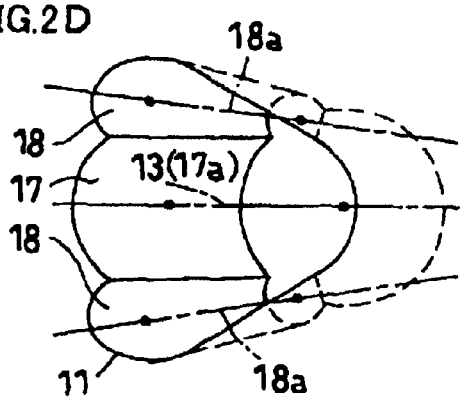

The main nozzle hole 11 is constructed as follows:

Referring to FIGS. 2A to 2D, the main nozzle hole 11 includes a main groove 17 and a pair of side grooves 18 communicatively continuous to the main groove 17 through banks (not numbered). In FIG. 2A, each side groove 18 is formed such that its central axis 18a is slightly behind the central axis 17a of the main groove 17. Each side groove 18 is also arranged that its angle of elevation is smaller than 45° of the axis 17a.

As best shown in FIG. 1A, each of the side grooves 18 gradually but slightly becomes narrower in width toward the depth of the main nozzle hole 11 while the main groove 17 remains the same along its full length. The side grooves are positioned such that the distance between them diminishes toward their forward ends. Each of the side grooves has a progressively diminishing cross-sectional area toward its forward end. When the mouthpiece is seen from just above, each of the side grooves is arranged at a position retreated from an upper opening of every sub-nozzle hole in parallel to a center axis of the main nozzle hole and immediately rearwards thereof.

Figure 4:
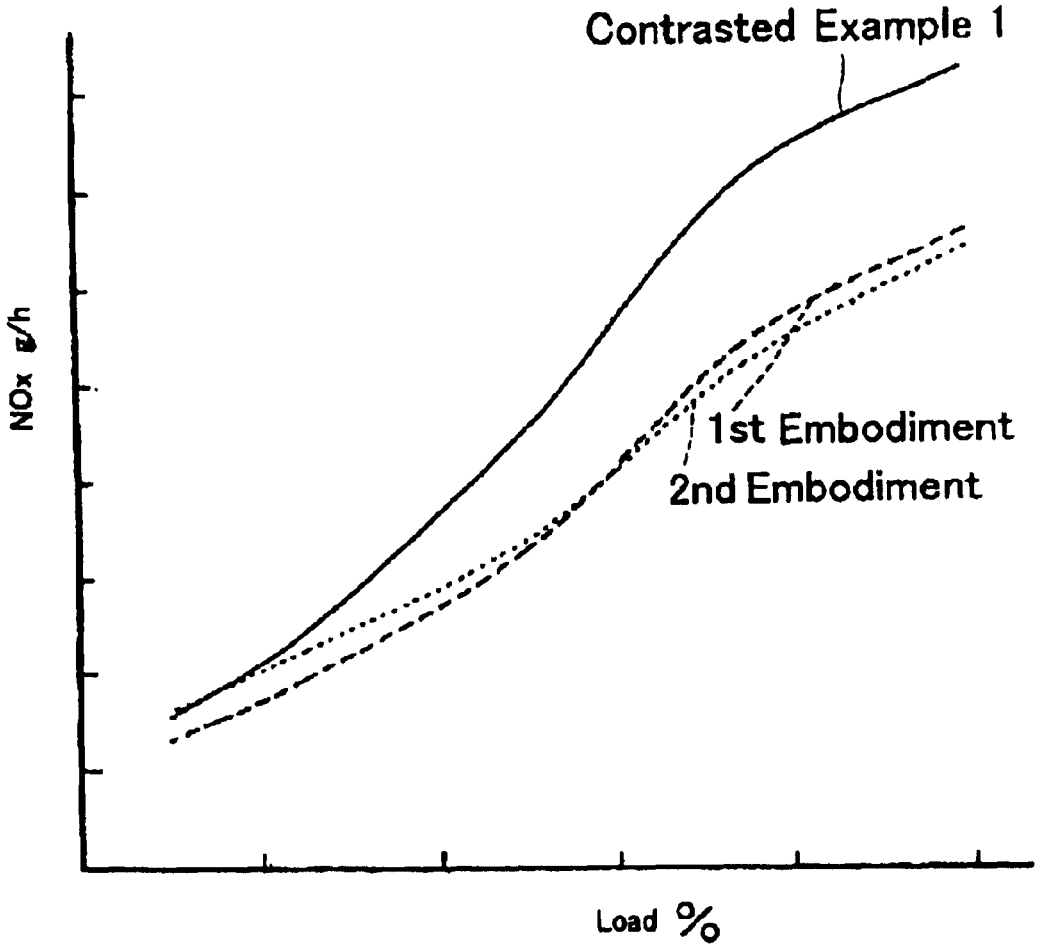
FIG. 4 is a graph showing NOx content in the exhaust gases under the first embodiment shown in FIG. 3, in comparison with a contrasted example 1 having no sub-nozzle holes.
Figure 5:
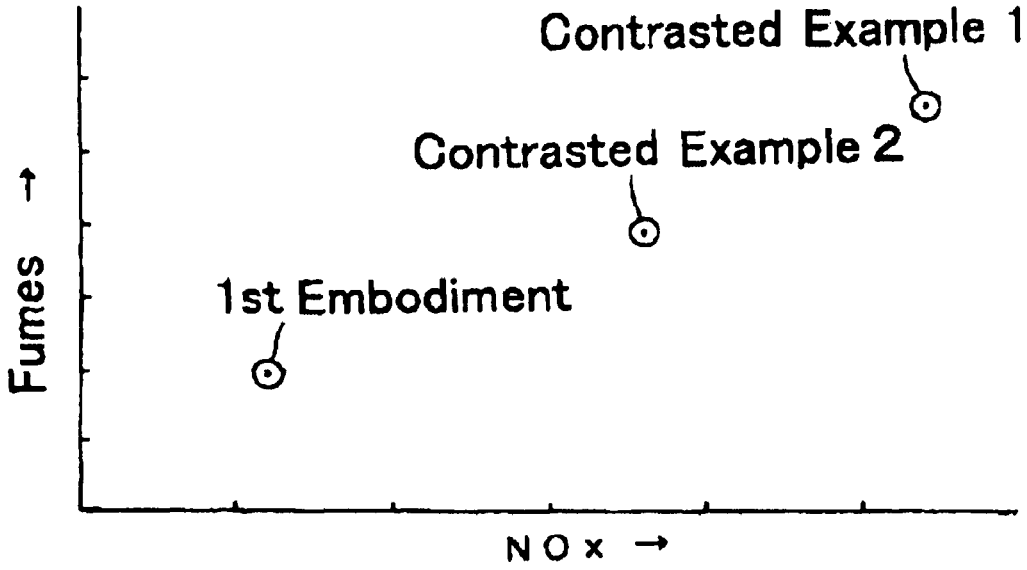
FIG. 5 is a graph showing the amount of NOx and fumes exhausted under the first embodiment shown in FIG. 3, in comparison with contrasted examples 1 and 2.

Referring FIGS. 4 and 5, the major advantage of the first embodiment is that environmental contaminants such as NOx and fumes are reduced in the exhaust gases, which will be demonstrated, on condition that the applied load is the same:

From FIG. 4, it will be understood that the first embodiment has less nitrogen oxides (NOx) than a contrasted example (1) that has neither sub-nozzle holes 12 nor the side grooves 18. It will be appreciated that the sub-nozzle holes 12 and the side grooves 18 are effective to reduce NOx content.

FIG. 5 shows that the first embodiment has less NOx and less fumes than contrasted examples 1 and 2, wherein the contrasted example 2 has sub-nozzle holes corresponding to the sub-nozzle holes 12 but no grooves corresponding to the side grooves 18. The comparison between the contrasted examples 1 and 2 shows that the addition of the secondary air sub-nozzle holes 12 are conducive to the reduction of NOx and fumes. Likewise, the comparison between the first embodiment and the contrasted example 2 shows that the side grooves 18 are conducive to the reduction of NOx and fumes.

Figures 6A, 6B, 6C:
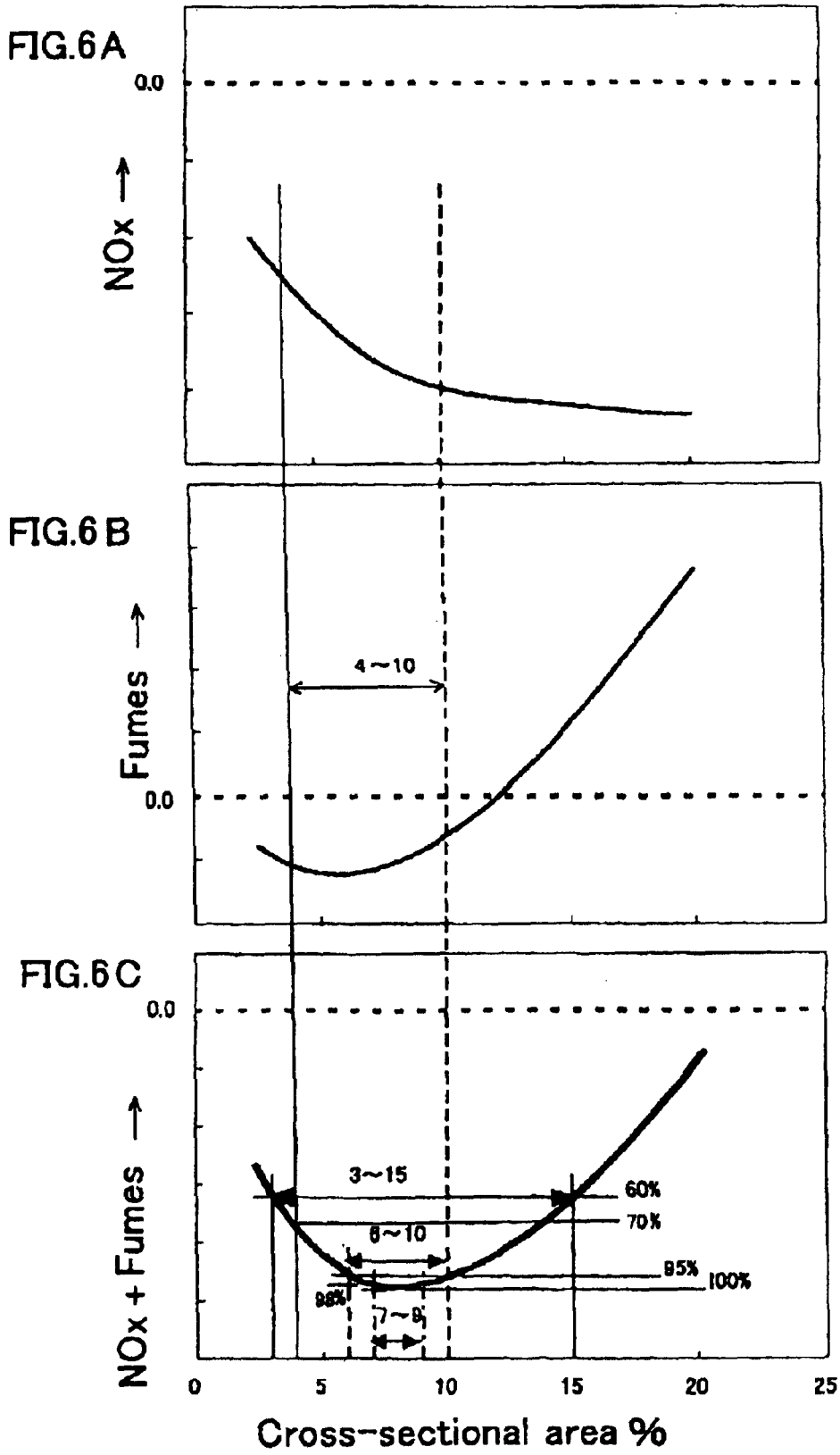
FIG. 6A showing variations in the amount of NOx in relation to the cross-sectional area.
FIG. 6B showing variations in the amount of fumes in relation to the cross-sectional area.
FIG. 6C showing variations in the total amount of NOx and fumes in relation to the cross-sectional area.
Figure 7A:
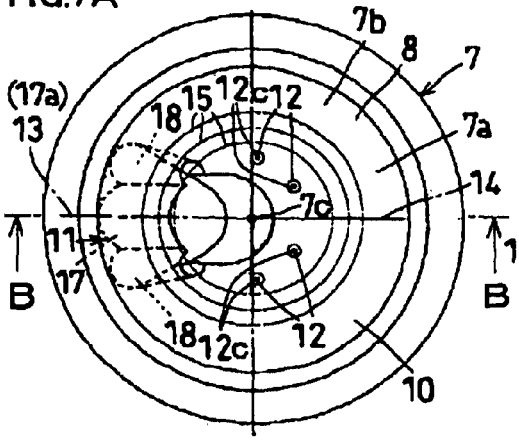
FIG. 7A being a plan view, FIG. 7B being a cross-sectional view taken along the line B—B in FIG. 7A.
Figure 7C:
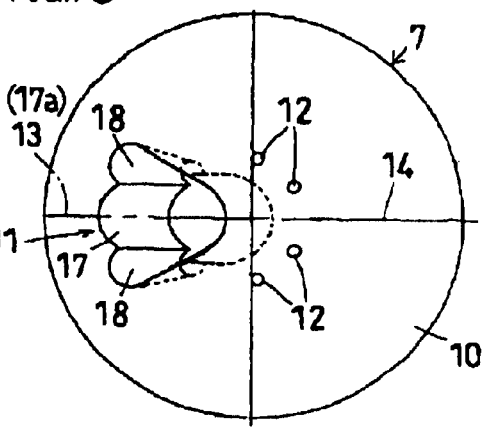
FIG. 7C being a bottom view, and FIG. 7D being a cross-sectional view taken along the line D—D in FIG. 7B.
Figure 7B:
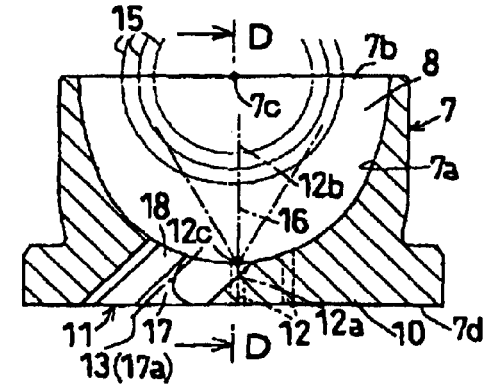
FIG. 7 is generally a diagrammatic view exemplifying the mouthpiece of a second embodiment.
Figure 7D:
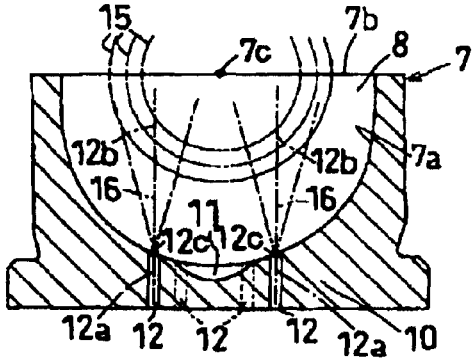
Figure 8A:
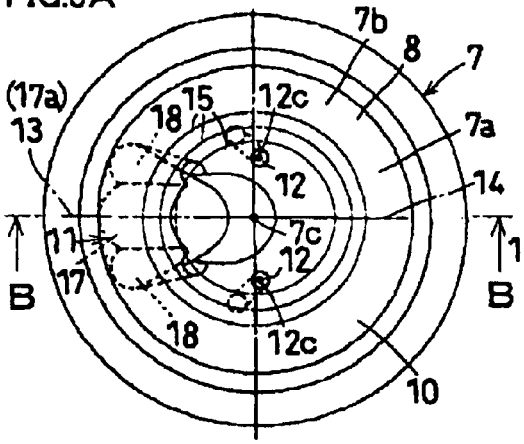
FIG. 8A being a plan view, FIG. 8B being a cross-sectional view taken along the line B—B in FIG. 8A.
Figure 8C:
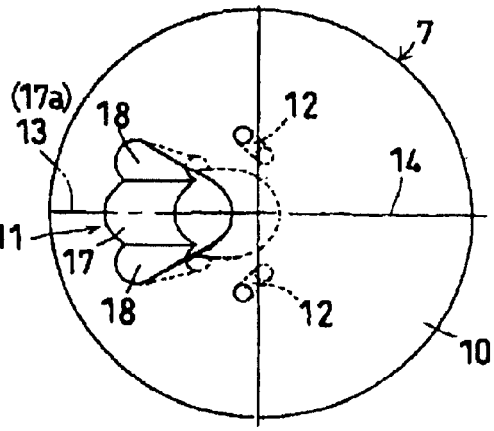
FIG. 8C being a bottom view, and FIG. 8D being a cross-sectional view taken along the line D—D in FIG. 8B.
Figure 8B:
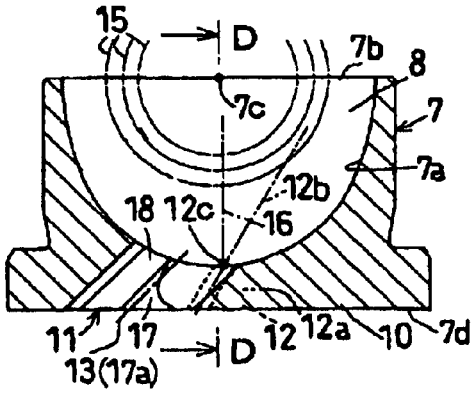
FIG. 8 is generally a diagrammatic view exemplifying the mouthpiece of a third embodiment.
Figure 8D:
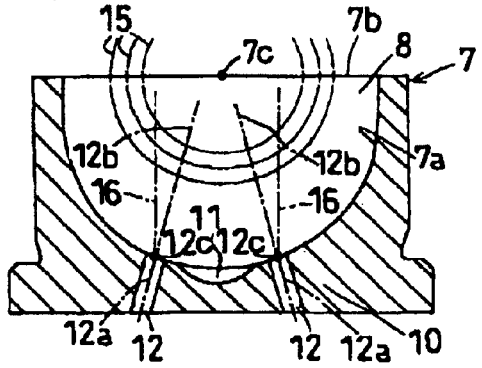

The efficiency of reducing exhaust gases depends upon the area of the open end of the sub-nozzle hole 12. Referring to FIGS. 6A to 6C, each horizontal co-ordinate is the percentage of the total minimum area of the open ends of the sub-nozzle holes 12 to the area of the open end of the main nozzle hole 11. The vertical co-ordinate of FIG. 6A indicates variations in the amount of NOx; in FIG. 6B the vertical co-ordinate indicates variations in the amount of fumes, and in FIG. 6C the vertical co-ordinate indicates variations in the total amount of NOx and fumes. Each coefficient of variation is calculated, as a reference value, based upon the amount of NOx and fumes produced in the combustion chamber having no sub-nozzle holes 12. Let the reference value be $\alpha$, and the amount of variation be $\beta$. Then, the coefficient of variation will be $(\beta-\alpha)/\alpha$.

As shown in FIG. 6C, the absolute value of the total reduction rate is maximized when the area of the open end of the sub-nozzle holes 12 is 7.7%. Let the absolute value of the reduction rate at this stage be 100%. It has been demonstrated that to increase the rate of reduction of exhaust gases up to 98%, the total area of the open ends of the sub-nozzle hole 12 must be in the range of 7 to 9%, and if it exceeds 95%, the total area can be in the range of 6 to 10%. If it exceeds 60%, the total area can be in the range of 3 to 15%. Among these ranges, when it exceeds 70%, and both NOx and fumes effectively decrease, the total area is in the range of 4 to 10%. As a result, it will be concluded that the total area of the open ends of the sub-nozzle holes preferably in the range of 3 to 15%; more preferably, 4 to 10%, further preferably, 6 to 10%, and most preferably, 7 to 9%.

Referring to FIGS. 7, 8 and 9, a second embodiment, a third embodiment and a fourth embodiment will be described, respectively:

In the second embodiment shown in FIG. 7 the total area of the open ends of the sub-nozzle holes 12 is 8% of the area (100%) of the open end of the main nozzle hole 11, wherein each sub-nozzle hole has an open end having the same area. This embodiment reduces the production of NOx or fumes or both, as clearly demonstrated by comparison with the contrasted examples 1 and 2.

In the third embodiment shown in FIG. 8 the pair of sub-nozzle holes 12 are inclined forwardly and upwardly toward the swirl chamber 8 or, in other words, slightly converged toward the swirl chamber 8 from the combustion chamber 9 in contrast to the first and second embodiments where they extend upright between the combustion chamber 9 and the swirl chamber 8. In FIG. 8B the angle of incline is 30° and in FIG. 8D, the angle of incline is 15° toward each other.

Figure 9A:
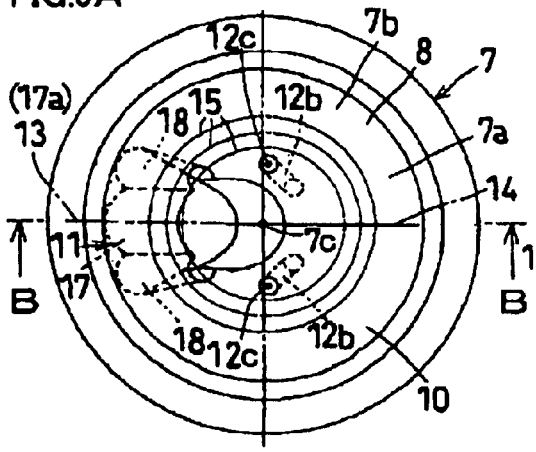
FIG. 9A being a plan view, FIG. 9B being a cross-sectional view taken along the line B—B in FIG. 9A.
Figure 9C:
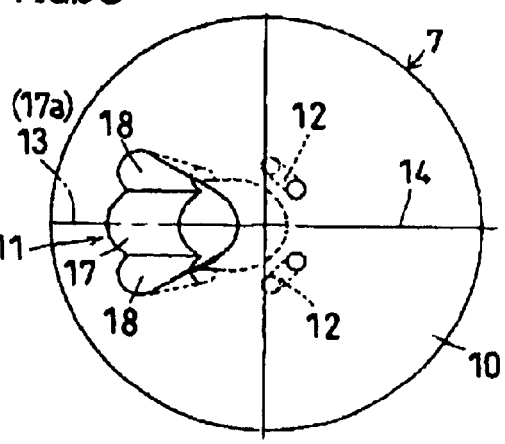
FIG. 9C being a bottom view, and FIG. 9D being a cross-sectional view taken along the line D—D in FIG. 9B.
Figure 9B:
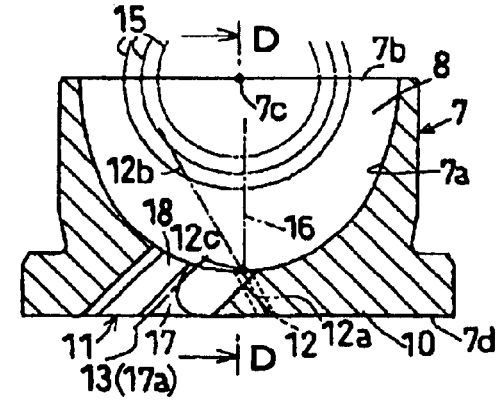
FIG. 9 is generally a diagrammatic view exemplifying the mouthpiece of a fourth embodiment.
Figure 9D:
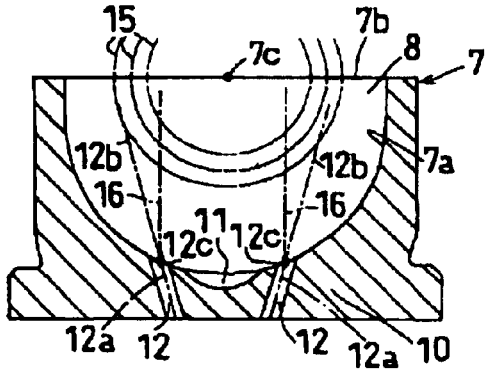
Figure 10A:
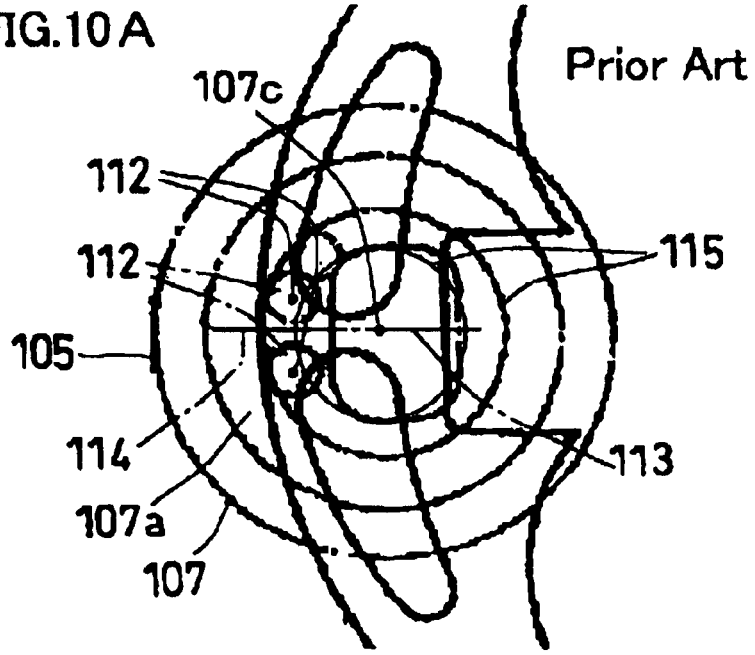
FIG. 10A being a plan view of the mouthpiece and the piston, and FIG. 10B being a vertical cross-sectional side view of a swirl chamber and surrounding part members.
Figure 10B:
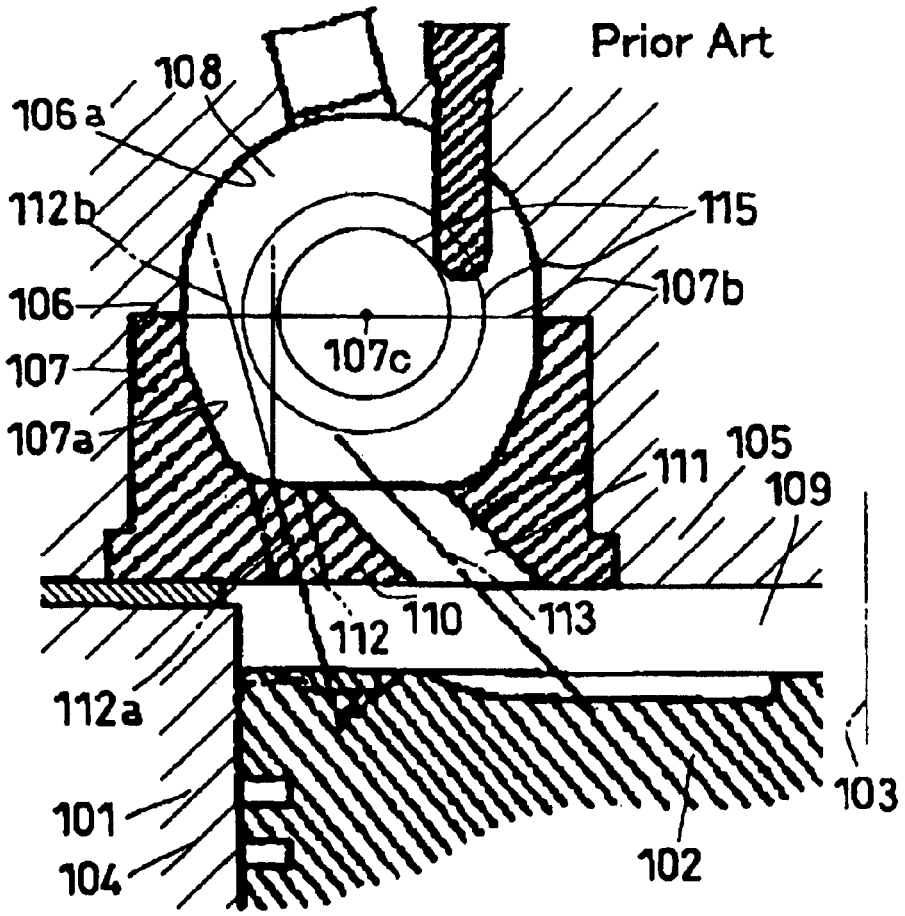
FIG. 10 is generally a diagrammatic view exemplifying a known swirl chamber.

In the fourth embodiment shown in FIGS. 9A to 9D, the pair of sub-nozzle holes 12 are inclined rearwardly and upwardly toward the swirl chamber 8, as best shown in FIG. 9B, and, as shown in FIG. 9D, are inclined outwardly or, in other words, slightly diverged toward the swirl chamber 8 from the combustion chamber 9. In FIG. 9B the angle of incline is 30° and in FIG. 9D, the angle of incline is 15° toward each other.

What is claimed is:

1. A swirl chamber used in association with a combustion chamber for diesel engines, wherein the combustion chamber is defined by a piston, a cylinder, and a cylinder head, the swirl chamber comprising:

a mouthpiece fitted in a [hole] *recess* of the cylinder head, the [hole] *recess* having a bottom-open recess, and the mouthpiece including a top-open recess, the bottom-open recess and the top-open recess constituting a space intended for the swirl chamber;

a main nozzle hole produced through a base wall of the mouthpiece to effect communication between the combustion chamber and the swirl chamber; and a pair of sub-nozzle holes, which are separated from the main nozzle hole, produced through the base wall of the mouthpiece, the *sub-nozzle* holes being positioned on opposite sides of [the] *a* central axis of the main nozzle hole when the mouthpiece is seen from just above;

[wherein each of the sub-nozzle holes is arranged to pass inside a hypothetical sphere depicted around a center of an upper circle of the top-open recess having a radius of 70% of a diameter of the upper circle of the top-open recess] *and a hypothetical sphere, which is centered at a center of an upper circle of the top-open recess, the hypothetical sphere has a radius of 70% of a radius of the upper circle of the top-open recess, and each of the sub-nozzle holes being arranged to pass a central axis of the sub-nozzle holes through an interior area of the hypothetical sphere;*

*wherein the main nozzle hole comprises a main groove and two side grooves, each of the side grooves is communicatively continuous with respect to the main groove through banks,*

*the main groove and each of the side grooves extend forwardly and upwardly from the main combustion chamber to the swirl chamber through the bottom wall, and*

*when the mouthpiece is viewed from above, each of the side grooves is arranged at a position rearwardly relative to an upper opening of the sub-nozzle holes.*

2. The swirl chamber as recited in claim 1, wherein the *hypothetical* sphere has a radius of 60% of the [diameter] *radius* of the upper circle of the top-open recess.

3. The swirl chamber as recited in claim 1, wherein the *hypothetical* sphere has a radius of 50% of the [diameter] *radius* of the upper circle of the top-open recess.

4. The swirl chamber as recited in claim 1, wherein each of the sub-nozzle holes is positioned such that [its respective] *a* center *of an upper open end of each of the sub-nozzle holes* overlaps the *hypothetical* sphere having a radius of 50% of the [diameter] *radius* of the upper circle of the top-open recess when the mouthpiece is [seen from just] *viewed from* above *the mouthpiece*.

5. The swirl chamber as recited in claim 1, wherein each of the sub-nozzle holes is positioned such that [its] *the* central [axis] *axes of the sub-nozzle holes* passes within an angular range of 0° to 30° away from a *hypothetical* reference line extending just upwards when the mouthpiece is [seen from a just lateral] *viewed from a* side [in a direction perpendicular to a center axis of the main nozzle hole] *of the mouthpiece*.

6. The swirl chamber as recited in claim 1, wherein each of the sub-nozzle holes is positioned such that [its] *the* central [axis passes] *axes of the sub-nozzle holes pass* within an angular range of 0° to 15° away from a *hypothetical* reference line extending just upwards when the mouthpiece is [seen in an immediately rearward direction with the main nozzle hole arranged to appear forwardly] *viewed from a rear*.

7. The swirl chamber as recited in claim 1, wherein [the] *a* total area of [the] open ends of the sub-nozzle holes is in [the] *a* range of 3% to 15% of [that] *a total area of an open end* of the main nozzle hole.

8. The swirl chamber as recited in claim 7, wherein the total area *of the open ends of the sub-nozzle holes* is in the range of 4% to 10% of [that] *the total area of the open end* of the main nozzle hole.

[9. The swirl chamber as recited in claim 1, wherein the main nozzle hole comprises a main groove and two side grooves each communicatively continuous to the main groove through banks.]

10. The swirl chamber as recited in claim [9] *1*, wherein the side grooves are positioned such that [their] central axes [exist] *of the side grooves are positioned* rearward [of that] *relative to a central axis* of the main groove when the mouthpiece is [seen from a just lateral side in a direction perpendicular to a center axis of the main nozzle hole] *viewed from a side of the mouthpiece*.

11. The swirl chamber as recited in claim 10, wherein each of the *central axes of the* side grooves [has its central axis] *is* inclined at a smaller angle than an angle at which the central axis of the main groove is inclined with respect to [the level] *an undersurface* of the base wall of the mouthpiece when the mouthpiece is [seen from a just lateral side in a direction perpendicular to a center axis of the main nozzle hole] *viewed from the side of the mouthpiece*.

12. The swirl chamber as recited in claim 11, wherein the side grooves are positioned such that [the] *a* distance between [them] *the central axes of the side grooves* diminishes toward [their] *a* forward end *of the side grooves*.

13. The swirl chamber as recited in claim [9] *1*, wherein each of the side grooves has a progressively diminishing cross-sectional area toward [its] *a* forward end *of the side grooves*.

[14. The swirl chamber as recited in claim 9, wherein when the mouthpiece is seen from just above, each of the side grooves is arranged at a position retreated from an upper opening of every sub-nozzle hole in parallel to the center axis of the main nozzle hole and immediately rearwards thereof.]

15. The swirl chamber as recited in claim 1, wherein each of the sub-nozzle holes is positioned such that [its] *a* central axis *of the sub-nozzle holes* passes within an angular range of 0° to 30° away from a *hypothetical* reference line extending just upwards when [the mouthpiece is seen from a just lateral side in a direction perpendicular to a center axis of the main nozzle hole and, the angular range is] *viewed from a side of the mouthpiece and, each of the sub-nozzle holes is arranged such that the central axes of the sub-nozzle holes passes within an angular range of* 0° to 15° away from the *hypothetical* reference line [extending just upwards] when the mouthpiece is [seen in an immediately rearward direction] *viewed* with the main nozzle hole [arranged to appear forwardly] *from the rear*.

16. The swirl chamber as recited in claim 15, wherein [the] *a* total area of [the] open ends of the sub-nozzle holes [is] *are* in the range of 3% to 15% of [that] *a total area* of the main nozzle hole.

[17. The swirl chamber as recited in claim 15, wherein the main nozzle hole comprises a main groove and two side grooves each communicatively continuous to the main groove through banks.]

[18. The swirl chamber as recited in claim 17, wherein when the mouthpiece is seen from just above, each of the side grooves is arranged at a position retreated from an upper opening of every sub-nozzle hole in parallel to the center axis of the main nozzle hole and immediately rearwards thereof.]

19. The swirl chamber as recited in claim 1, wherein the sub-nozzle holes are positioned such that [their] central axes *of the sub-nozzle holes* are *positioned* upright on the base wall of the mouthpiece when the mouthpiece is [seen from a just lateral side in a direction perpendicular to a center axis of the main nozzle hole] *viewed from a side*.

20. The swirl chamber as recited in claim 1, wherein the sub-nozzle holes are positioned such that [their] central axes *of the sub-nozzle holes* are upright on the base wall of the mouthpiece when the mouthpiece is [seen from an immediately rearward direction] *viewed* with the main nozzle hole [arranged to appear forwardly] *from a rear*.

21. The swirl chamber as recited in claim 1, wherein the sub-nozzle holes are positioned such that [their] central axes *of the sub-nozzle holes* are upright on the base wall of the mouthpiece when the mouthpiece is [seen from a just lateral side in a direction perpendicular to a center axis of the main nozzle hole] *viewed from a side*, and the sub-nozzle holes are positioned such that [their] *the* central axes *of the sub-nozzle holes* are upright on the base wall of the mouthpiece when the mouthpiece is [seen in an immediately rearward direction] *viewed* with the main nozzle hole [arranged to appear forwardly] *from a rear*.

22. The swirl chamber as recited in claim 21, wherein [the] *a* total area of [the] open ends of the sub-nozzle holes is in the range of 3% to 15% of [that] *a total area* of the main nozzle hole.

[23. The swirl chamber as recited in claim 21, wherein the main nozzle hole comprises a main groove and two side grooves each communicatively continuous to the main groove through banks.]

[24. The swirl chamber as recited in claim 23, wherein each of the side grooves is positioned such that its central axis is in parallel to, and rearward of, the central axis of the main groove.]

25. The swirl chamber as recited in claim 1 wherein [each of the side grooves is forwardly inclined at an angle of elevation] *the sub-nozzle holes extend generally forwardly and upwardly* from [a main] *the* combustion chamber to the swirl chamber *through the base wall*.

26. The swirl chamber as recited in claim 1, wherein the each of the [side grooves is rearward inclined at an angle of elevation] *sub-nozzle holes extend generally rearwardly and upwardly* from [a main] *the* combustion chamber to the swirl chamber *through the base wall*.

27. The swirl chamber as recited in claim 1, wherein the sub-nozzle holes are positioned such that [the] *a* distance between [them] *the sub-nozzle holes* becomes narrower [toward their] *proximate* top open ends *of the sub-nozzle holes*.

28. The swirl chamber as recited in claim 1, wherein the sub-nozzle holes are positioned such that [the] *a* distance between [them] *the sub-nozzle holes* becomes wider [toward their] *proximate* top open ends *of the sub-nozzle holes*.

* * * * *